(12) United States Patent
Allen

(10) Patent No.: US 6,738,083 B2
(45) Date of Patent: May 18, 2004

(54) METHOD AND SYSTEM OF DISPLAYING TELECOMMUNICATION TRACE DIAGNOSTIC INFORMATION

(75) Inventor: Dowell Allen, Boca Raton, FL (US)

(73) Assignee: Siemens Information and Communication Networks, Inc., Boca Raton, FL (US)

( * ) Notice: Subject to any disclaimer, the term of this patent is extended or adjusted under 35 U.S.C. 154(b) by 473 days.

(21) Appl. No.: 09/741,229

(22) Filed: Dec. 20, 2000

(65) Prior Publication Data

US 2002/0075326 A1 Jun. 20, 2002

(51) Int. Cl.[7] .................................................. G06F 3/00
(52) U.S. Cl. ...................... 345/781; 345/792; 345/793
(58) Field of Search ................................ 345/764, 781, 345/792, 793, 808, 809; 707/2; 717/124, 125

(56) References Cited

U.S. PATENT DOCUMENTS 6,282,701 B1 * 8/2001 Wygodny et al. ............. 717/4
6,456,845 B1 * 9/2002 Drum et al. ................ 455/424
6,570,592 B1 * 5/2003 Sajdak et al. .............. 345/769

\* cited by examiner

Primary Examiner—Raymond J. Bayerl
Assistant Examiner—Kieu D. Vu

(57) ABSTRACT

A display format for a distributed system and method using a catalog definition language (CDL) based integrated trace analysis (iTAS) application for decoding telecommunication tracer information originating from any telecommunication network element and utilizing any Industry standard or proprietary telecommunication protocol using a browser-based graphical user interface (GUI). The display format of the browser-based graphical user interface (GUI) includes a common display page having three panes in which to display a tree view of trace events, a view of the decoded trace data, and a view of the original trace. The view within all three panes can be synchronized based on the selection of an event from the tree view pane. Additional panes on the common display page are provided for controlling the display, searching and filtering the contents of the three panes, and displaying the progress of decoding.

17 Claims, 10 Drawing Sheets

METHOD AND SYSTEM OF DISPLAYING TELECOMMUNICATION TRACE DIAGNOSTIC INFORMATION

CROSS-REFERENCE TO RELATED APPLICATIONS

This application is related in subject matter to co-pending U.S. patent applications Ser. No. 09/540,184 filed Mar. 31, 2000, by Dowell Allen for "Method and System of Encoding and Decoding Telecommunication Tracer Information," and Ser. No. 09/540,183 filed Mar. 31, 2000, by Dowell Allen for "System and Method for Trace Diagnostics of Telecommunications Systems," and assigned to a common assignee herewith. Co-pending U.S. patent applications Ser. No. 09/540,184 and Ser. No. 09/540,183, are incorporated herein by reference.

DESCRIPTION

BACKGROUND OF THE INVENTION

1. Field of the Invention

The present invention generally relates to a system and method for telecommunication system trace diagnostics and, more particularly, to a system and method that displays telecommunication system tracer information from any number of a plurality of tracer telecommunications protocols in a manner to facilitate telecommunication system diagnostics by a user. Telecommunications systems, as used herein, refers to any computer and/or telephone system, in a stand-alone or networked configuration, that is used to electronically communicate information.

2. Background Description

The swift advance of telecommunications technology over the latter half of the twentieth century promises a future in which a broad suite of services is available to the network user. These services cover a wide spectrum of activities encompassing traditional telephony and computer data transmission as well as the integration of these activities. The future user of telecommunications technology can expect digital telephony, high-speed data transmission, real-time video, high fidelity audio, and the combination of these activities into multimedia products all to be readily available over a network that interconnects users throughout the world.

In the first half of the twentieth century, telephony architecture developed along the lines of a circuit-switched network providing audio communication to potentially every person in the world. Then, Private Branch Exchanges (PBXs) that provide a local telephone network within a building but that also retain access to the larger global network were developed. PBXs represent an example of a network within a network.

With the advent of the personal computer in the 1970s, early computer network architectures were developed that led to the internetworking of computers in a manner analogous to the internetworking of telephones. Motivated by the desire to distribute resources among user's who may communicate with each other, Local Area Networks (LANs) were developed that allowed a local interconnection of computers. They may be thought of as being analogous to the PBXs. The recognition that users within one LAN may wish to communicate with users in a separate LAN led to the development of Wide Area Networks (WANs), which may be thought of as a network of networks. Such networking of personal computers has led to new user services such as electronic mail and electronic file sharing.

Because modern telecommunications equipment, including everything from routers and switches to telephones and personal computers, comprises a wide range of purposes, the telecommunications and computer industries have formulated the Open Systems Interface (OSI) model to provide a basis for developing and coordinating standards for internetworking systems developed by a variety of vendors/users. This approach models the telecommunications process as a structure of seven layers. These layers address, in turn, the physical connection, the data link, network functions, transport and data flow, session management, presentation, and finally the application, as basic features of an end-to-end communication process. The basis for the workability of a telecommunications network is the set of rules for communicating known as the protocol. Various protocols exist for each layer of the OSI model. These protocols are required to connect different physical devices, for example, telephones and personal computers to multiple pipelines such as copper wire and fiber optics. These pipelines use a variety of switching approaches, for example, circuit switching and packet switching, each of which has different performance criteria in a wide variety of end-user applications, such as low latency for telephone systems and low error rate for data exchange systems.

In addition to the user-based network functions (e.g., transmission of voice or data), each network requires a system for controlling the network in a fashion transparent to the user. When a person picks up the telephone to place a call, for example, a signal is sent to a central office (CO) switch to alert it that a user wishes to make a call. A response is sent back to the user in the form of a dial tone to indicate that the required network resources are available. This communication, which is essentially invisible to the caller, is an example of the kind of control functions that are necessarily implemented in the operation of any network. For the telephone network, the control system is known as Signaling System Number 7 (SS7). As implemented, SS7 comprises a suite of protocols, each of which serves a specific function in controlling the network. For example, the protocol named the Message Transfer Part (MTP) insures that traffic flows through the network by redirecting traffic around failed or overloaded nodes. Another SS7 protocol is the Transaction Capabilities Part (TCAP), which is used in querying any databases that are utilized in controlling the network. Because of its nature as a control system, SS7 is not necessarily limited to use in telephone networks. SS7 and the techniques associated with it are proving useful in more general, computer-based telecommunications networks. Thus, it is clear that network control is an important and potentially complex aspect of telecommunications networking operations.

A critical function in the control of any network, be it a LAN, a PBX, or the Internet, is the management of network resources in order to diagnose and troubleshoot problems, to monitor system performance and to assess traffic patterns and loads. One of the tools commonly available to assist the network engineer in fulfilling a part of this management function is a software application generically known as a tracer. A tracer is a software program that outputs a record of network events (i.e., a trace) in order to aid the engineer in troubleshooting network operations. Due to the variety of technologies that contribute to a modern telecommunications network, a network engineer may be required to utilize a broad array of tracer programs in order to troubleshoot and diagnose problems that can occur in the various aspects of the network. A tracer used to query a telephone network necessarily obtains different information than a tracer used to query a LAN. Moreover, because a given type of network (e.g., LAN) may be manufactured by multiple vendors, each of whom may choose different protocols for use within the network, tracer programs must interact with a wide variety of telecommunications protocols. The network engineer must be conversant with the operation and utilization of many tracer programs interacting with a variety of protocols in order to implement the required network management functions.

Quite often, the output of these various tracer programs is provided in a non-readable binary or hexadecimal format and requires decoding to a human readable format, such as English. Co-pending patent applications Ser. No. 09/540,184 and Ser. No. 09/540,183 describe systems, methods and a catalog definition language (CDL) by which a plurality of tracers can be unified into a common tool-set to provide a coherent and consistent view of the decoding of tracer output from a plurality of tracers. These co-pending patent applications also describe the system and method by which a plurality of telecommunication protocols that are integrated within any tracer can be decoded to provide a contextual view of tracer events to facilitate the diagnostic process. Because of the generality and flexibility of the system and methods of the invention based on CDL, it becomes feasible to unify many tracers within a single tool while simultaneously decoding a plurality of telecommunication protocols. Since the invention can accommodate many tracers and telecommunication protocols, referred to as catalogs, the invention requires a common method of display that can accommodate a diversity of tracers and protocols while at the same time providing a display that can be easily used and understood.

The display is implemented using a graphical user interface, GUI. Graphical user interfaces are not new and they have been used in a multitude of software applications for many years. However, this claimed invention pertains specifically to its use in a format that meets the needs of co-pending patent applications Ser. No. 09/540,184 and Ser. No. 09/540,183.

SUMMARY OF THE INVENTION

It is therefore an object of the present invention to provide a method for displaying CDL decoded telecommunication trace results in a consistent display format that is both easy to use and easy to understand.

According to the invention, the method of displaying CDL decoded trace results can be based on a window of three panes in which to display (1) a tree view of trace events, (2) a view of the decoded trace data, and (3) a view of the original trace. For each original trace request partial results are displayed in the tree view and the decoded trace data, with regular updating until complete results are provided. Also the display provides for a plurality of concurrently pending original trace requests. The view within all three panes can be synchronized based on the selection of an event from either the tree view pane or from the original trace. Further, any pane can be collapsed if required.

In this display method, a window is dedicated to each separate display, and all these displays are contained within a trace browser's main window. The general principle of the design is that the application is essentially contained within a single view, and there is never a need to navigate through multiple views. This avoids the navigational risk of getting lost within a browser-based forward/backward paging structure of the application. The full functionality of the browser's menus, toolbars and display results remains available to the user in a single view.

The invention provides a method for displaying telecommunication trace diagnostic information in a graphical user interface, the diagnostic information being based on a catalog definition language to effect decoding, comprising a number of steps. One step uses a commercially available Internet browser for connecting to a web site on a web server hosting an integrated trace analysis (iTAS) application, the iTAS application providing trace analysis services having an encoding and decoding sub-system using a catalog definition language (CDL). Another step selects the iTAS application from the web site. A further step requests one or more functions to be performed by the iTAS application service. An additional step, performed for each requested function, displays the result of the iTAS service requested in a browser based graphical user interface. In this method, for each requested function partial results are displayed with regular status updating until the complete results are provided, and the graphical user interface provides for a plurality of concurrently pending functions.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Graphical user interfaces to provide means for interacting with and controlling software applications are already in common usage. Use of a graphical user interface (GUI) executing on a client workstation and communicating with a back-end server-based application is also in common usage; the same is true for GUI's operating within the context of commercially available internet browsers. Thus, for those skilled in the art, the use of browser-based graphical user interfaces to provide clients (computer workstations) with access to back-end application servers is well-known. However, what is new about this invention is the application of a browser-based, graphical user interface (GUI) to an integrated trace analysis system that utilizes an Encoding and Decoding system using a catalog definition language (CDL) to enable decoding. Also, a further aim of this invention is to provide the GUI in a format suitable for interfacing with and satisfying the display requirements of an integrated trace analysis system. The catalog definition language and the system and method used in creating this integrated trace analysis system is more fully described in co-pending patent applications Ser. No. 09/540,184 and Ser. No. 09/540,813 respectively.

Figure 1:
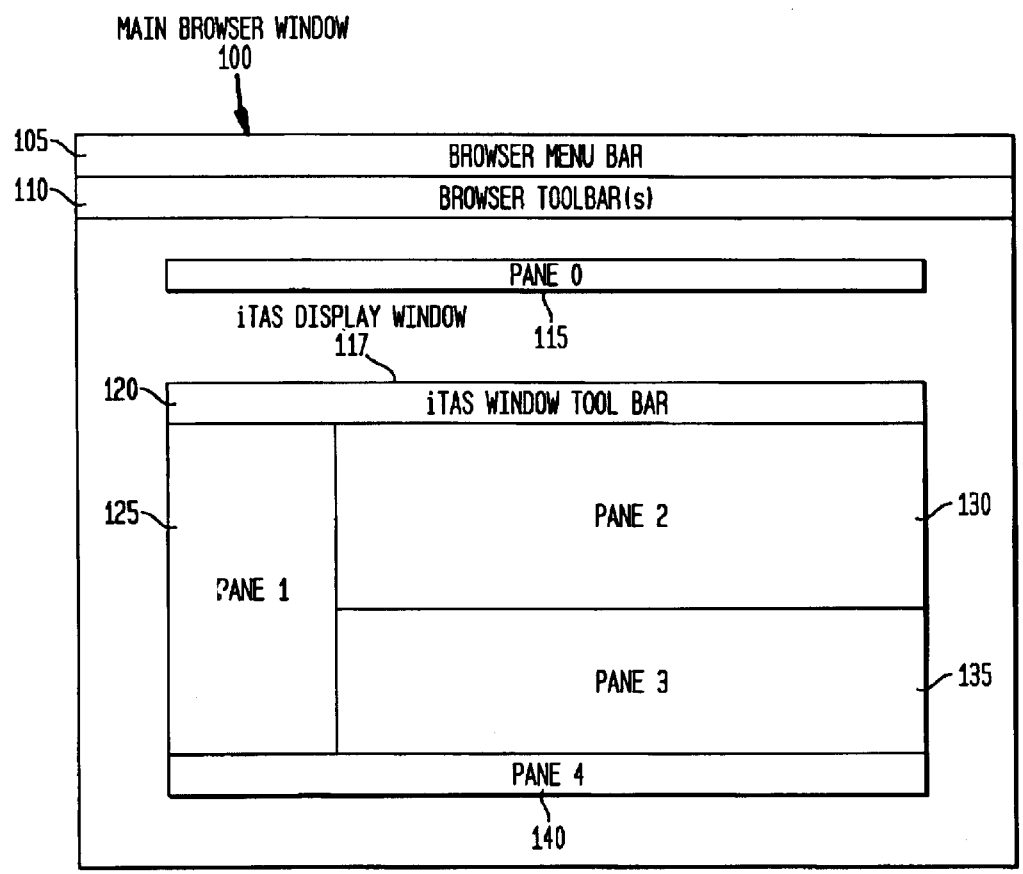
FIG. 1 is a block diagram of the general structure of the display according to the present invention.

Referring now to the drawings, and more particularly to FIG. 1, there is shown a high-level block diagram of the general display format of the integrated trace analysis system (iTAS) browser-based graphical user interface (GUI) display 100. The browser's menu-bar 105 and toolbars 110 typically exist in the area shown. Most commercial browsers typically have one or more configurable toolbars that can be collapsed to provide more room for an application display. For example, Microsoft's internet browser (Internet Explorer) uses the F11 function key on the keyboard to show or hide its toolbars.

FIG. 1 illustrates a typical iTAS display window 117. At the top of the display window is a toolbar 120 that controls the views of the window and provides status information on the particular task, such as decoding, that is being performed. This toolbar is a part of the window display. The display window 117 consists of three panes: a tree view of trace events 125, a view of decoded trace data 130, and a view of the original trace 135. The item above the display window is Pane 0 115 that contains a menu-bar and search and filtering combo boxes for the iTAS application. The menu-bar in Pane 0 115 generally has global scope and affects all display windows that are open within the browser. However, the search and filtering combo boxes that are located in 115 perform functions on user-selected display windows and these functions are local to the selected display window. At the bottom of the display window is Pane 4 140, which is primarily used for displaying progress status information. Pane 4 140 and Pane 0 115 may be removed from view through use of workstation function keys or mouse operation if required by the user. Typically, Pane 4 140 can be collapsed from view when a decoding operation is completed.

Figure 2:
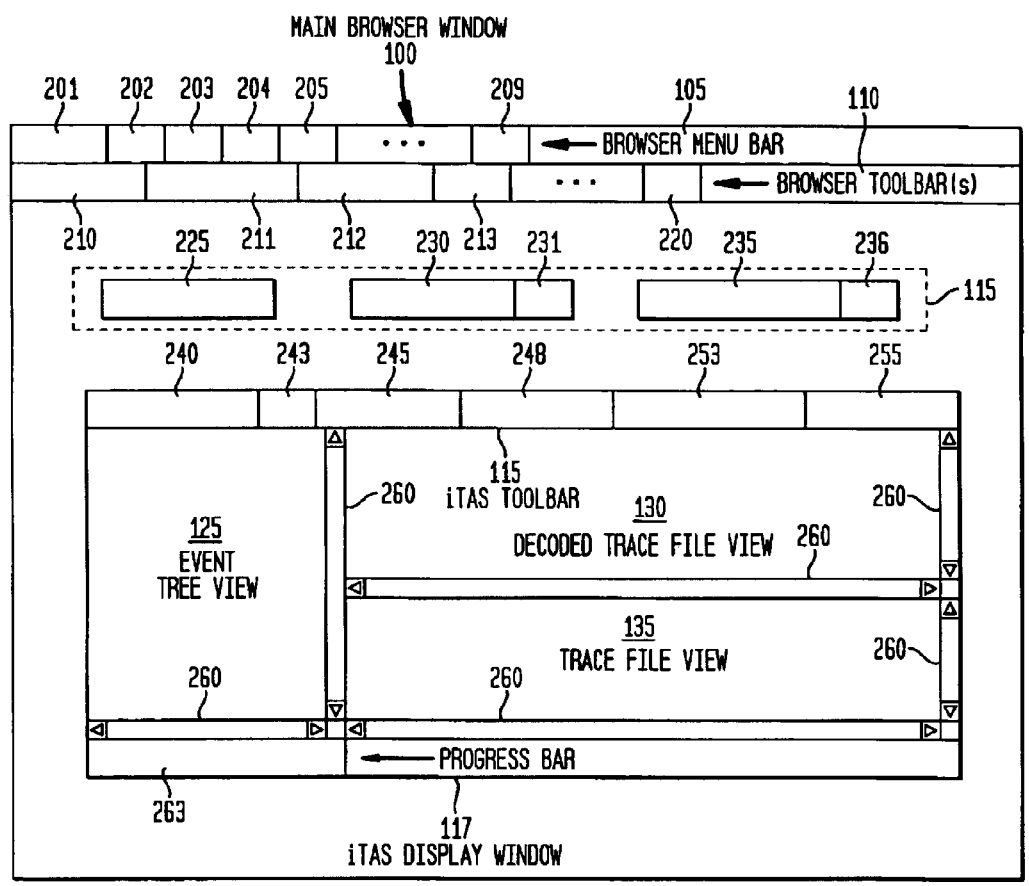
FIG. 2 is a more detailed block diagram of the general structure of the display with the toolbar for a display.

FIG. 2 illustrates a more detailed display format. Menu items 201 to 207, for example, are typically browser menu items such as File, Edit, View, etc. Icons 210 to 220, for example, are typically the browser's command buttons and boxes in which the user can input data to the browser such as an URL (Uniform Resource Locator) address to locate a given web-based server and service. There can be one or more toolbars selected and configured by the user. However, it is not the intent to provide a description of what exists in commercial browsers. The main purpose is to provide a description of the iTAS GUI that operates within the confines of a browser.

According to existing standard practice, all of the iTAS icons/command buttons have a tool tip that displays the purpose of each icon. To activate a message box help presentation on each toolbar icon or combo box, the user highlights the item by placing the workstation mouse over the item and depressing a function key that is on the workstation keyboard. As per standard practice an icon/command button is activated, de-activated, or toggled by clicking it once, using the workstation mouse. Further as per standard existing practice each pane 125, 130 and 135 in FIG. 2 has horizontal and vertical scroll bars 260 that become visible for use if required.

Referring to FIG. 2, the iTAS menu-bar 225 has menus that have menu-items. When activated, each menu-item activates a form to be completed and eventually submitted to the session manager in the iTAS engine via a web server. The iTAS engine and the web server can be executed from the same platform if desired. The iTAS engine is fully described in co-pending patent applications Ser. No. 09/540, 184 and Ser. No. 09/540,183. The functionality covered by the menu-bar includes but is not necessarily limited to:

1) A "trace" operation menu by which a user submits a request for trace decoding/extracting.
2) A "system" menu that an administrator uses to gain access to the administration functionality. The menu is protected by an "access" menu item that prompts for user and password before access to the other menu items is provided.
3) A "window" menu that can be used to change the views of multiple display windows, 117, to cascading, tiling, etc.

Item 230 is a combo box into which a user can type a string to be searched for within the selected pane 130, 135 in a display window 117. Item 231 is an icon/button used to activate the search. Item 235 is a combo box into which the user can type a Boolean expression to select specific events in the event tree view 125. Item 236 is the icon/button used to activate the execution of the Boolean expression that provides a general filtering capability. Thus, for example, an expression such as (string1 && string2) will select only those events that contains both "string1" and "string2". Strings can be quoted if they contain spaces or tabs. Further, special characters such as quotes (") can be included in the string by preceding it with a backslash character (\). The backslash character itself can be included in the string by preceding it with another backslash character (\\). Filter expressions are stored in the combo box 235 and can be selected for execution at the discretion of the user. When a filter has executed and matching events are found, those events are highlighted (or tagged) in the event tree 125. Removal of the highlights/tags placed in the event tree 125 by the filter operation is accomplished via a select/de-select button in the event tree. The event tree consists of events and sub-events within events or sub-events.

Item 240 in the display window toolbar represent a "view" control group. The icons/command buttons in this group provide the capability to:

1) Hide or show the tree view 125. When the tree view is hidden, the panes 130 and 135 are expanded to fill the space.
2) Hide or show the decoded file view 130.
3) Hide or show the trace file view 135. If the decoded file view 130 is hidden then, by default, the trace file view is shown.

Item 243 is an event ordering icon/command button to toggle the tree view display event sequence between ascending or descending time order. Item 245 is a "display mode" control group. The functionality covered by this group of icons/command buttons includes but is not necessarily limited to:

1) The ability to single step through the events in the event tree. As an event in the event tree 125 is selected, the decoding of that event is shown in the decoded trace file view 130. At any one time, only one event is shown in 130.
2) The ability to append decoding of the events selected in the event tree 125. The appended results are displayed in the decoded trace file view 130. The "append" mode provides the capability to cull particular events in any desired order.
3) The ability to display the full decoding in the decoded trace file view 130.

4) The ability to activate or de-activate auto-scrolling. When auto-scrolling is activated, the event selected from the event tree 125 is displayed in the decoded trace file view 130 and at the same time the trace file view 135 is automatically scrolled to the selected event.

Figure 3:
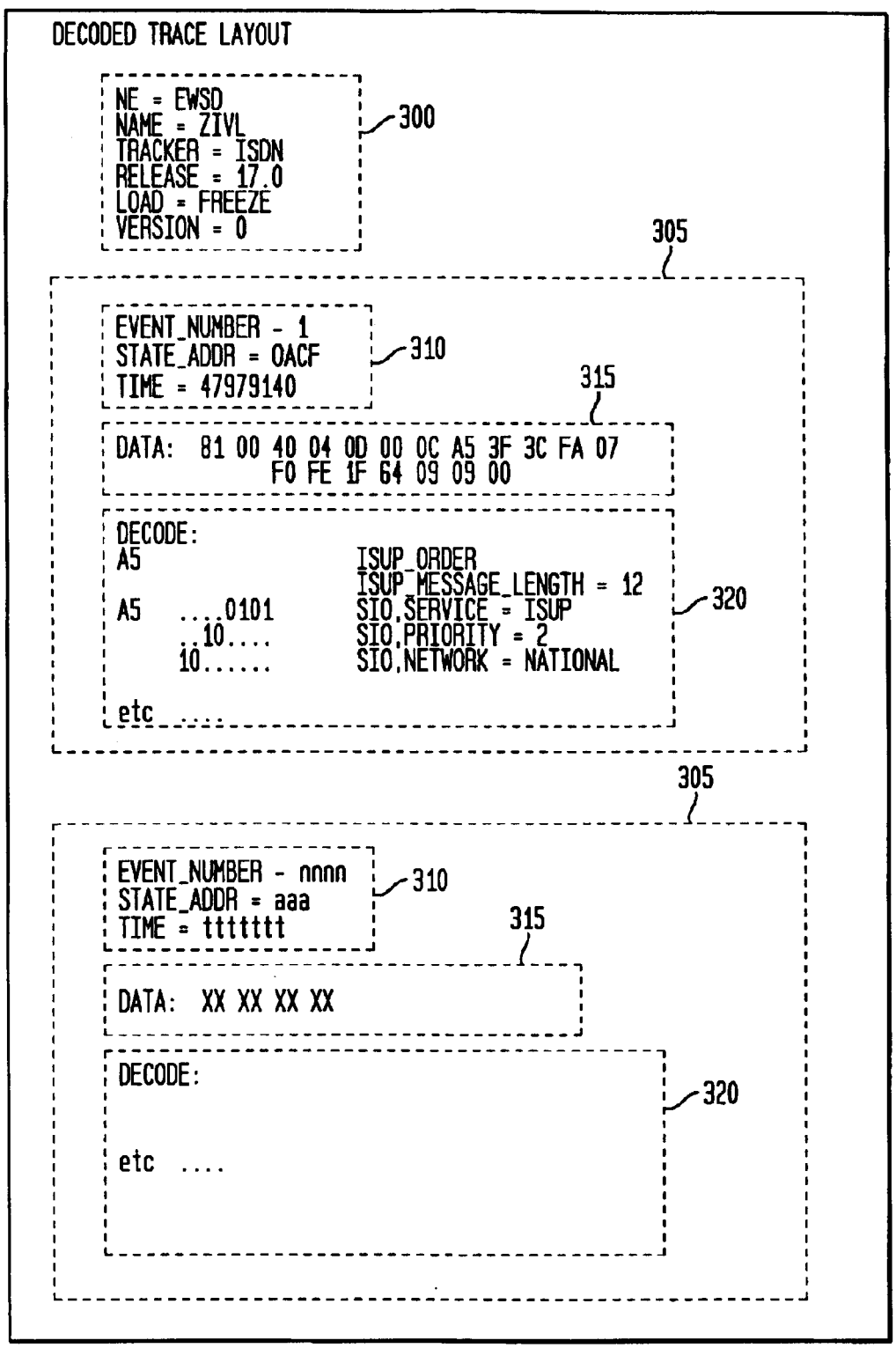
FIG. 3 illustrates the general structure of a decoded trace file.

Item 248 is a "special filter" control group. As illustrated in FIG. 3, the display format for decoded trace data is structured to provide trace header information 300 and for each decoded event 305 in the trace there is an event header information section 310, an event data section 315, and an event decoding section 320. The trace header 300 provides information that applies to the entire trace. The event header section 310 provides information specific to that event. The event data section 315 displays the binary data in hexadecimal format that is to be decoded. The decoding section 320 provides the decoding result of the event data section 315 in human readable prose format. The functionality covered by the group 248 of icons/command buttons includes but is not necessarily limited to:

1) The ability to show or hide the event header section of decoded events in the decoded trace file view 130.
2) The ability to show or hide the data section of the decoded events in the decoded trace file view 130.
3) The ability to show or hide the decoding section of the events in the decoded trace file view 130.
4) The ability to show or hide the decoding of zero's (0) in the decoded trace file view 130 that occurs in the event data section 315. When the "zero" filter is toggled on, all event byte codes with a value of zero are removed from the decoding section. Quite often, an event can have many event byte codes with a value of zero, and the user does not wish to see the decoding of these "zero" byte codes.

Item 263 is a status bar that shows the state the display window is in. These states are "loading trace file," and subsequently a count down of the remaining number of kilobytes to be decoded. When, the count is zero the trace is fully decoded and a complete" status is indicated. Upon completion, the status label 253 indicates the number of "events" extracted/decoded, and Pane 4 140 is collapsed from view if desired by the user. Pane 4 140 can also contain a tool bar to address additional functions. It is to be understood that the toolbar 120 and Pane 4 140 can easily be made to contain any toolbar icons as required to control the displays in a window display 117. Further, each display window 117 can be closed at any time if desired by the user, through use of the window's "close/exit" capability, thereby allowing work in progress to be terminated.

Item 255 is a group that displays the properties of the trace in Pane 3 135. These properties could be the network element, the network element name, tracer name, release, load and version information.

Figure 4:
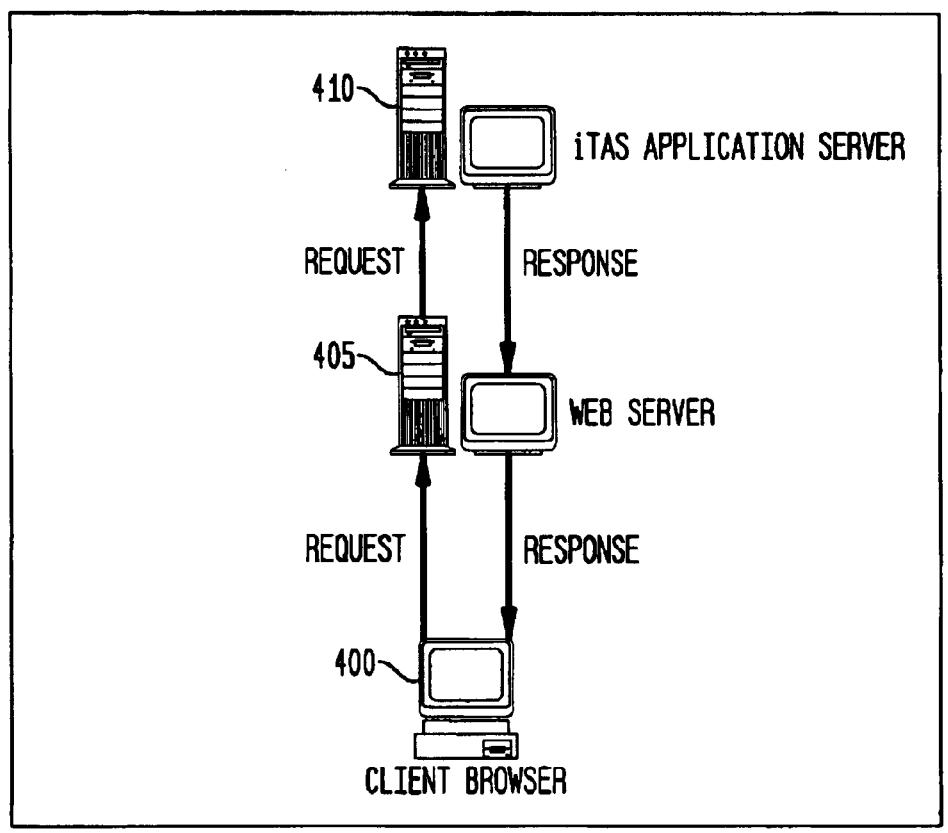
FIG. 4 illustrates a typical client/server configuration.
Figure 5:
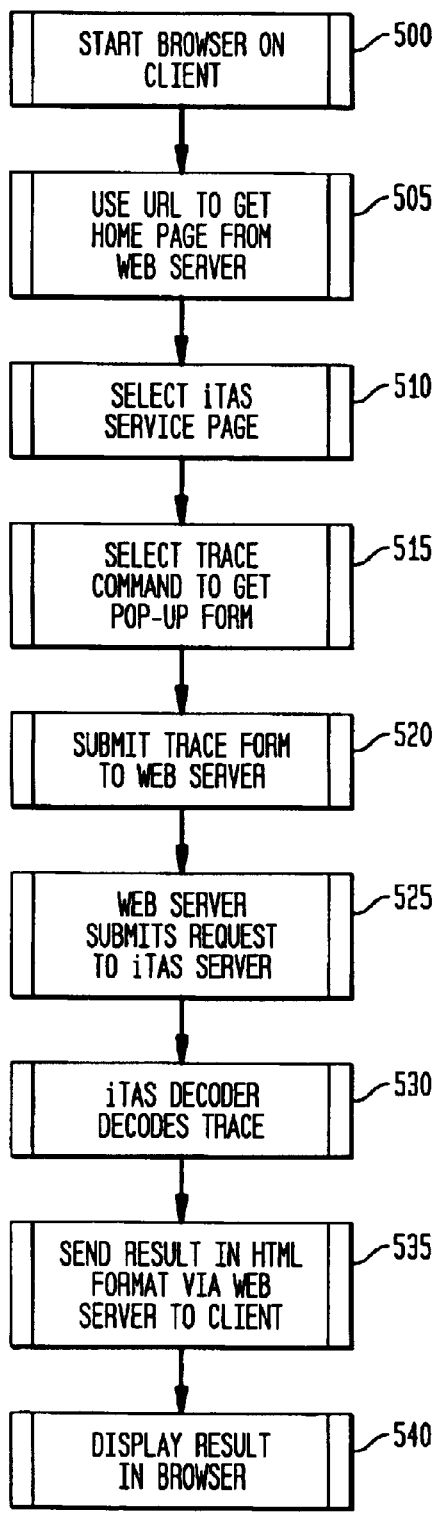
FIG. 5 is a flow chart of the method used in building a display.

For purposes of illustration FIG. 4 shows a typical simplified view of the interactions between a client workstation browser and the iTAS server 410. The iTAS server 410 could also be bundled with the web server 405 on the same platform and also distributed across a network. Co-pending patent application Ser. No. 09/741,230 more fully describes the operation of the iTAS invention within the context of networks. FIG. 4 illustrates the client making a request to a web server for service and receiving a response. FIG. 5 illustrates a typical process flow that occurs for making a request, via a client browser, for a decoding service that is provided by an iTAS application service. The process flow of this method allows for partial results 530, 532 to be handled by the client display with frequent updating and display until the trace is fully decoded. Thus the user need not wait until a trace is fully decoded before a display is presented. The process flow method of FIG. 5 is typical for requests made of the servers for either decoding or administration functions such as registering new administrator accounts, new servers, new CDL catalogs, etc. In all instances a form is presented at the brower, filled in by the user, and then submitted. The results are then returned either directly from the web server or via the web server from an iTAS service function.

Several bitmaps illustrate some of the functionality described here. It is to be understood that these bitmaps are from a prototype GUI currently in use for a desktop version of the integrated trace analysis system tool. The GUI described herein and illustrated in drawing FIGS. 6 through 10 illustrate the appearance of an exemplary display in accordance with one aspect of the invention. It is to be understood that these figures are illustrative only and do not show all the features described in connection with FIG. 2, which is more fully-featured to leverage the utility provided by browsers and to accommodate operation of the tool within an intranet/internet version of the integrated trace analysis system, iTAS. The preferred embodiment of the tool is as generically described in FIG. 2.

Figure 6:
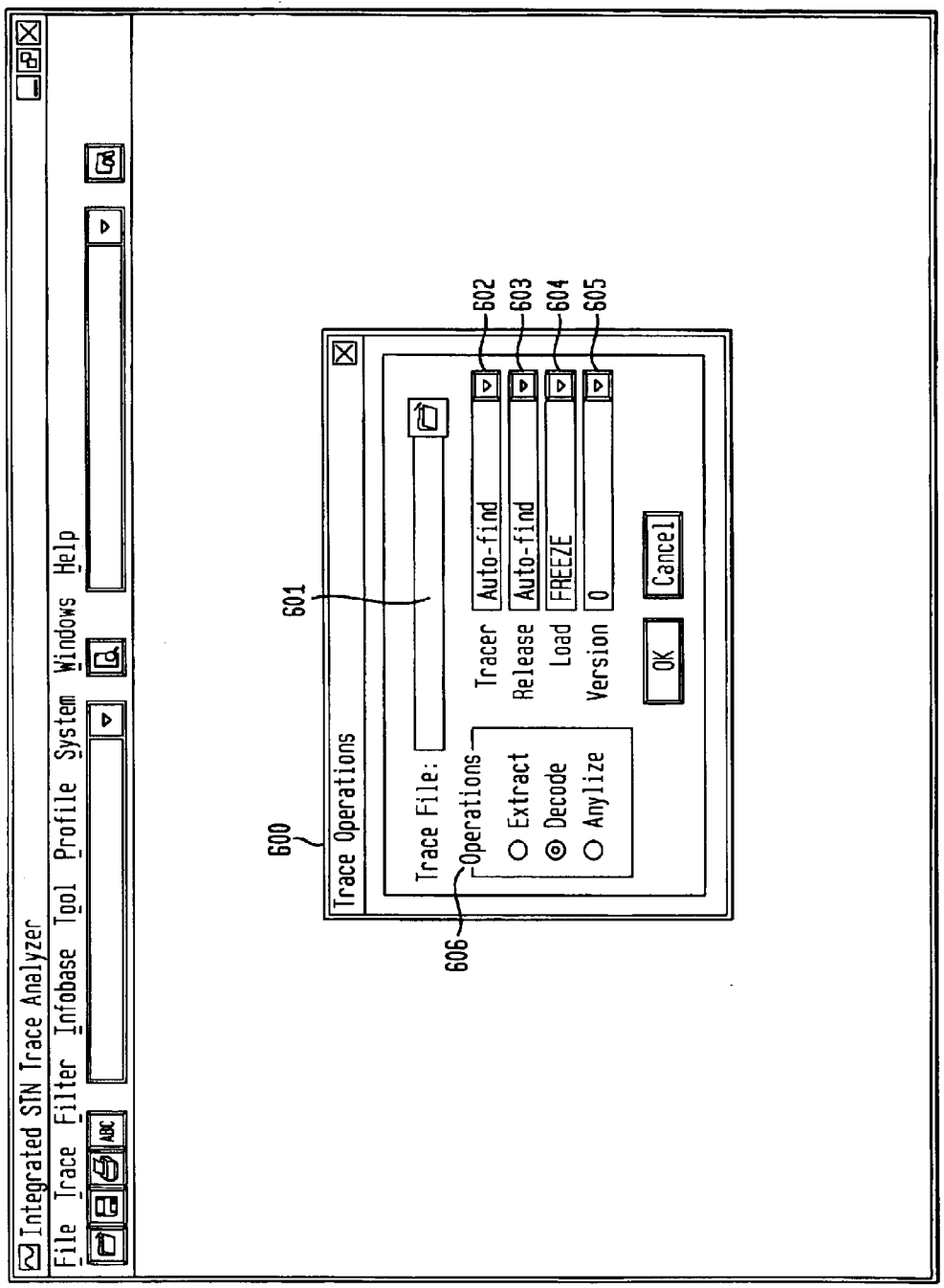
FIG. 6 is a prototype bitmap illustrating the main form to be filled in and submitted to obtain a decoding of a trace file.
Figure 7:
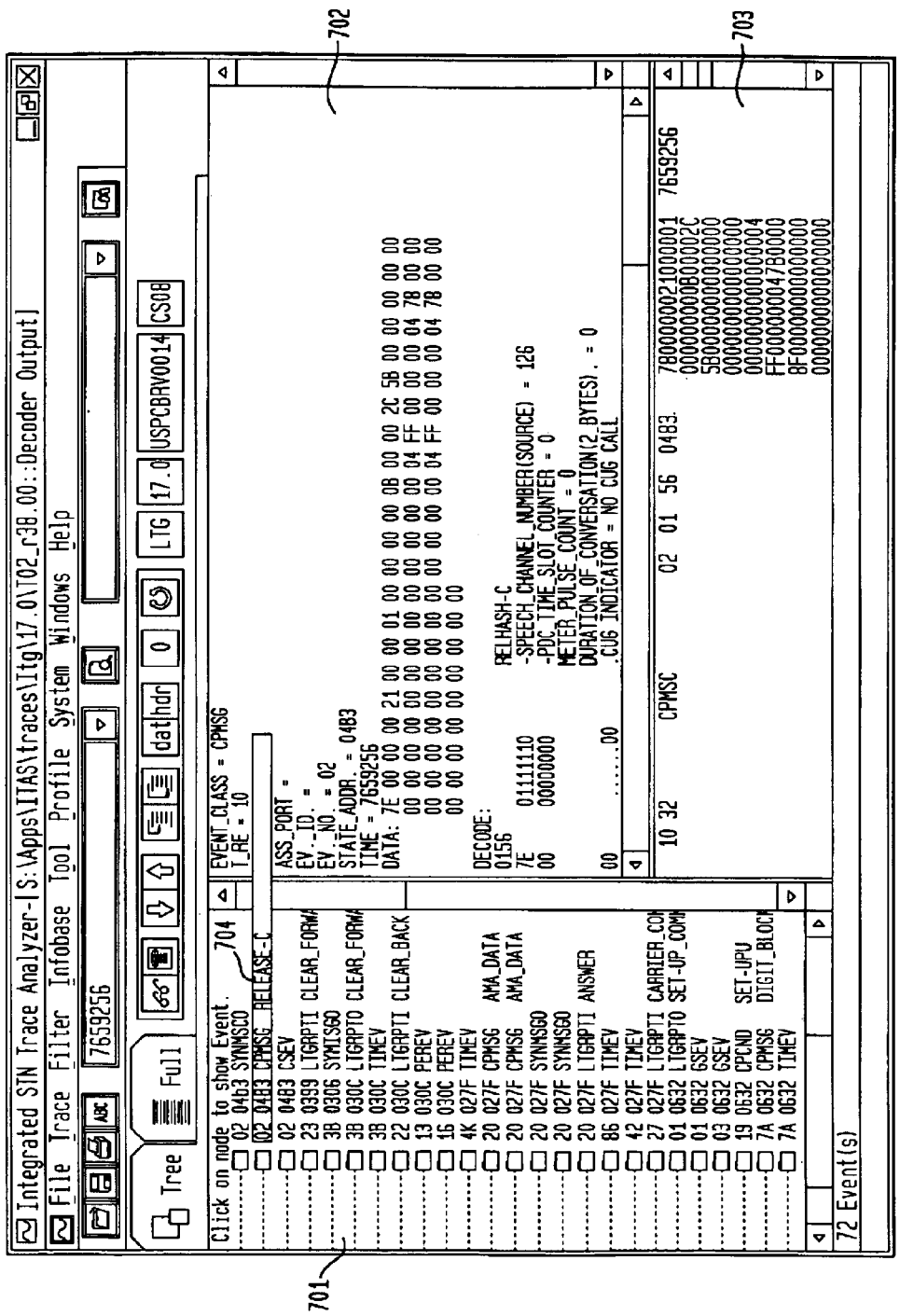
FIG. 7 is a prototype bitmap illustrating a window display of a decoded trace with auto-scroll.
Figure 8:
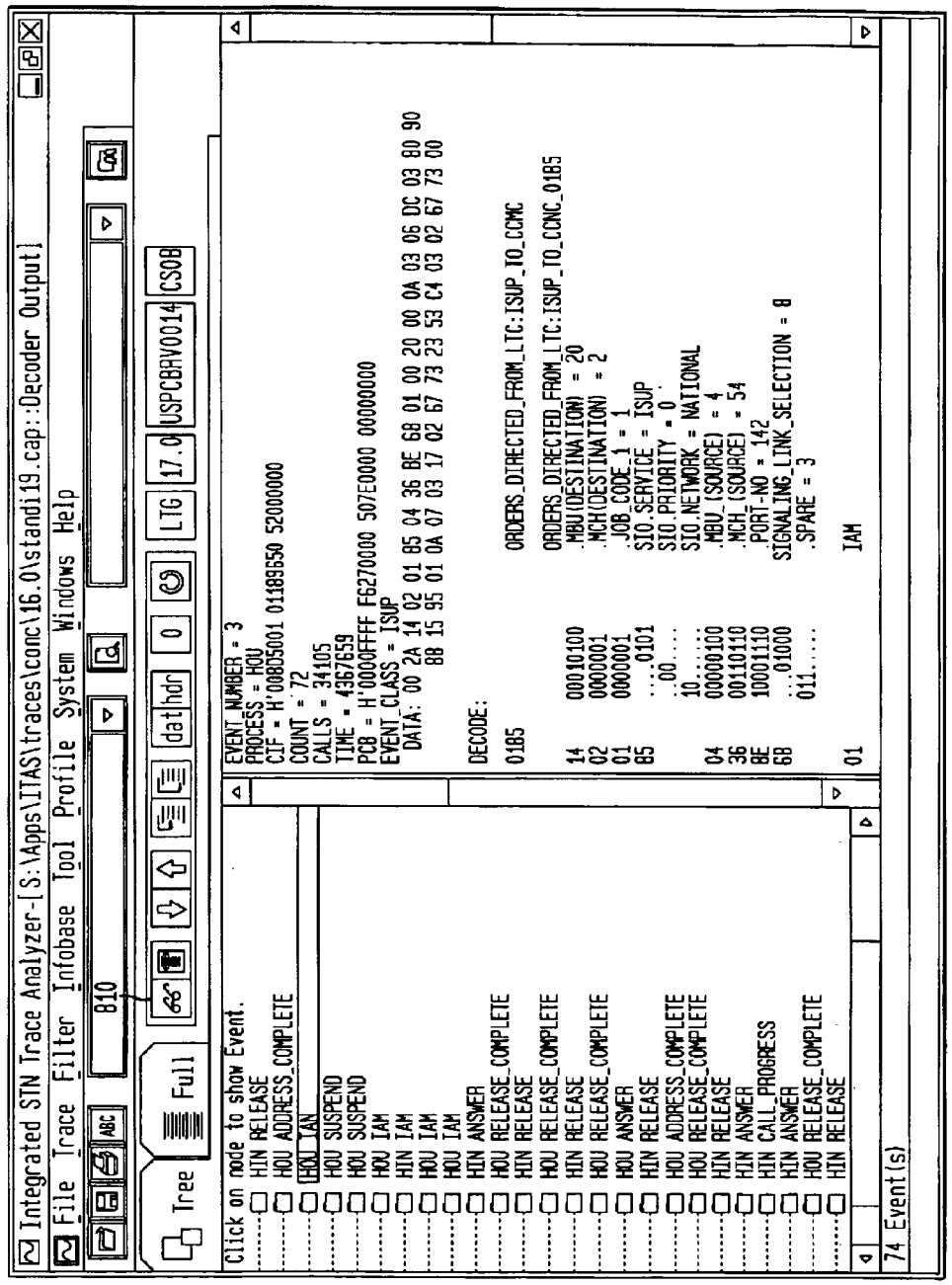
FIG. 8 is a prototype bitmap illustrating the display without showing the trace file view.
Figure 9:
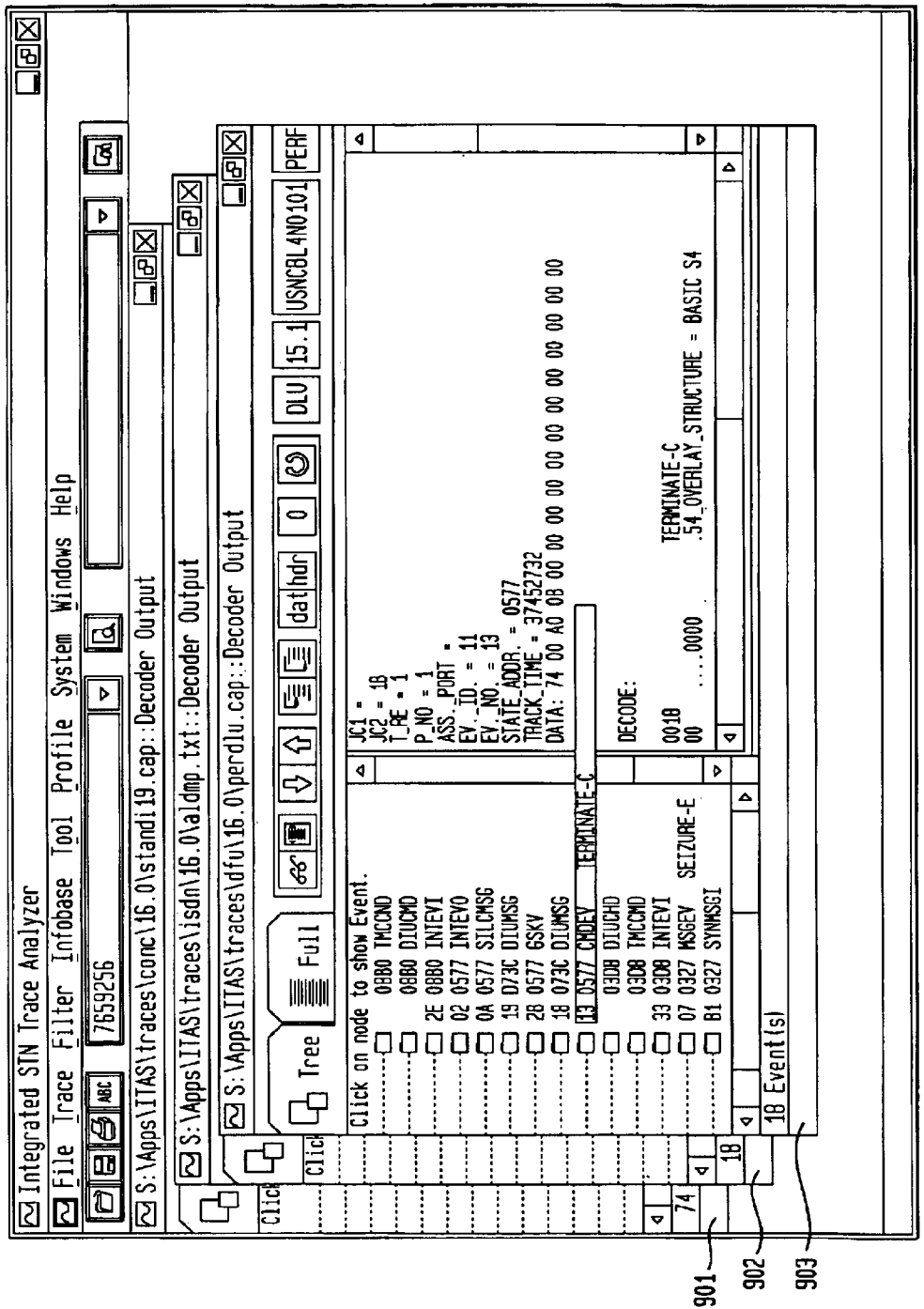
FIG. 9 shows multiple trace display windows in "cascade" style.
Figure 10:
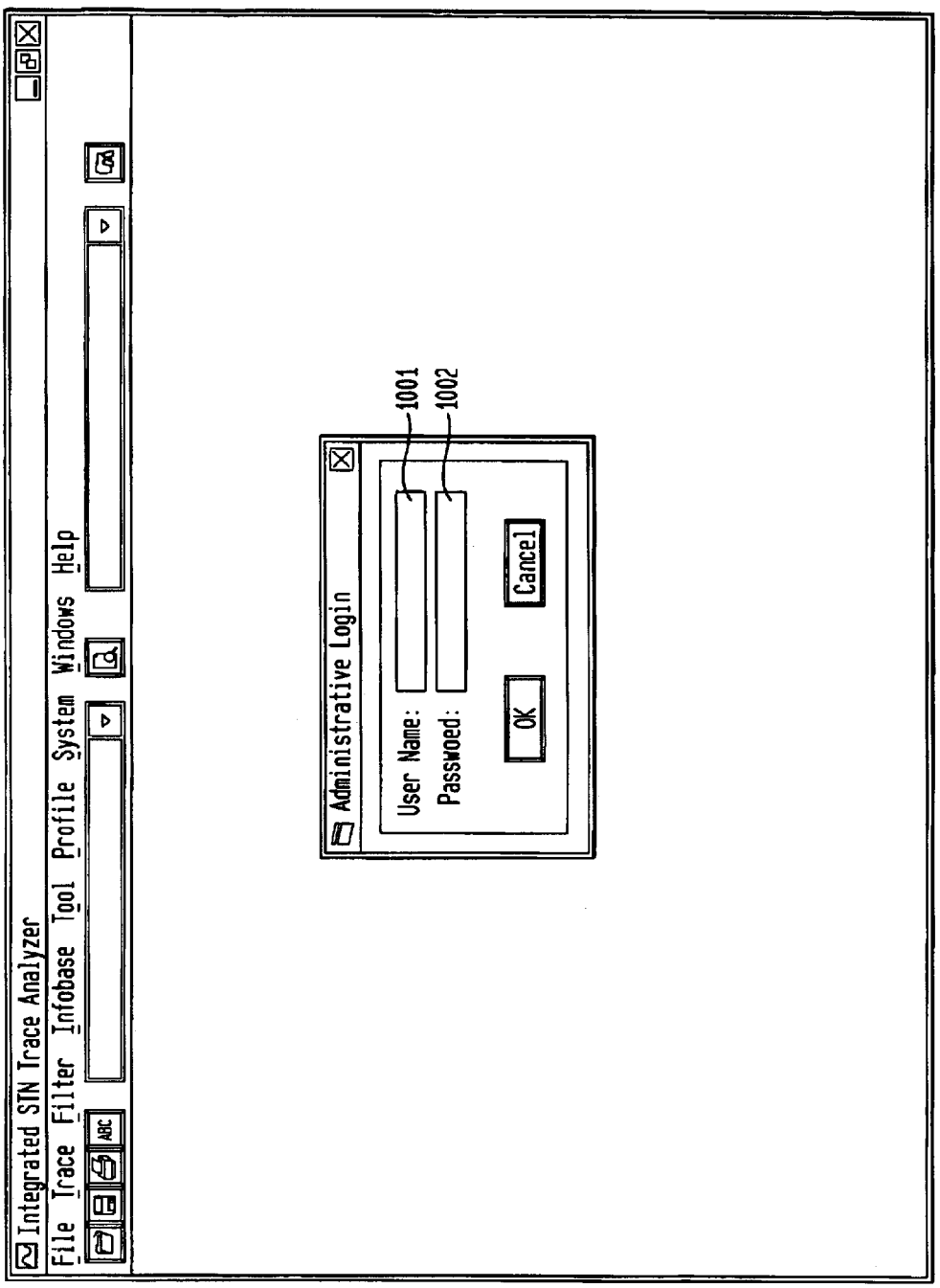
FIG. 10 is a prototype bitmap illustrating the use of the "system" drop down menu to gain access to administrative functions in the menu.

FIG. 6 is a prototype bitmap illustrating the main form, trace operations 600, to be filled in and submitted to obtain a decoding of a trace file 601. The form as shown includes fields to designate the tracer 602, the release 603, the load 604 and the version 605. In the Operations box 606 the radio button "Decode" is selected to indicate choice of the decode operation. FIG. 7 is a prototype bitmap illustrating a window display of a decoded trace, similar to the layout of FIG. 2. This figure also illustrates the selection of an event 704 in the event tree 701, the decoding of that event in the decoded result view 702, and the scrolling to that event in the trace file 703 that was decoded. FIG. 8 is a prototype bitmap illustrating a display similar to the layout of FIG. 2 but without showing the trace file view (135 in FIG. 1A and 703 in FIG. 7). The trace file view can be hidden or displayed by user activation of a toggle icon or command, here illustrated by icon 810. FIG. 9 shows multiple trace display windows 901, 902 and 903 in "cascade" style. FIG. 10 is a prototype bitmap illustrating the use of the administrative access menu item in the "system" drop down. The "access menu item controls access to other menu items in the "system" menu via a user name 1001 and password 1002. However, it should be recognized that there can be other display formats and modifications within the scope of this invention.

While the invention has been described in terms of a single preferred embodiment, those skilled in the art will recognize that the invention can be practiced with modification within the spirit and scope of the appended claims.

Having thus described my invention, what I claim as new and desire to secure by letters patent is as follows:

1. A system for displaying telecommunication trace diagnostic information in a graphical user interface, comprising:
   an integrated trace analysis (iTAS) application, said iTAS application providing trace analysis services having an encoding and decoding sub-system using a catalog definition language (CDL);
   a web server hosting said iTAS application on a web site;
   wherein said web site provides a browser based graphical user interface enabling the browser to request one or more functions to be performed by said iTAS application service, each said requested function having results displayed in said graphical user interface, and
   wherein for each requested function partial results are displayed with regular updating until the complete results are provided; and wherein said graphical user interface provides for a plurality of concurrently pending functions.

2. A method for displaying telecommunication trace diagnostic information in a graphical user interface, said diagnostic information being based on a catalog definition language to effect decoding, comprising the steps of:
using an Internet browser for connecting to a web site on a web server hosting an integrated trace analysis (iTAS) application, said iTAS application at said web site providing trace analysis services having an encoding and decoding sub-system using a catalog definition language (CDL);
selecting said iTAS application from said web site;
requesting one or more functions to be performed by the iTAS application service;
for each requested function displaying the result of the iTAS service requested in a browser based graphical user interface;
wherein for each requested function partial results are displayed with regular updating until the complete results are provided; and
wherein said graphical user interface provides for a plurality of concurrently pending functions.

3. A display for an integrated trace analysis system tool that is based on the use of a catalog definition language to effect decoding, comprising:
a first display pane for showing a tree view of a plurality of trace events responsive to one or more original traces;
a second display pane for showing decoded trace data for trace events selected in said tree view pane;
a third display pane for showing a view of said original traces,
wherein for each original trace request partial results are displayed in said first and second display panes with regular updating until complete results are provided; and
wherein said display provides for a plurality of concurrently pending original trace requests.

4. The display of claim 3, further comprising:
a control pane containing a menu-bar and combo boxes, said menu bar applying to any of said first, second and third display panes which are open and said combo boxes being for searching and/or filtering a selected one of said first, second, or third display panes;
a tool bar pane for controlling said display and providing status information on said results displayed in said tree view pane; and
a status pane for displaying progress status information on said results of decoding displayed in said second pane.

5. The display of claim 4, wherein said control pane and said status pane are removed from view.

6. The display of claim 4, wherein said menu bar contains a plurality menu-items which when activated pop up a form, there being a pop up form menu item for at least one of:
user submission of a request for trace decoding/extracting;
administrator submission of user name and password for access to an administrator menu;
user selection of a multiple window mode for display of multiple windows containing said first, second and third display panes.

7. The display of claim 4, wherein one of said combo boxes allows a user to search the selected pane for a text string.

8. The display of claim 4, wherein one of said combo boxes allows a user to form a boolean expression for selecting trace events in said trace event tree.

9. The display of claim 4, wherein said tool bar contains view control icons for providing at least one of:
hiding or showing said event tree view pane;
hiding or showing said second display pane;
hiding or showing said third display pane,
wherein if the second display pane is hidden then the third display pane is shown by default.

10. The display of claim 4, wherein said tool bar contains an event or ring icon for toggling said event tree view between ascending or descending time order.

11. The display of claim 4, wherein said tool bar contains display mode icon for providing at least one of:
selecting a next event in order in the event tree, wherein decoded trace data for said next event is displayed in said second pane when said next event is selected;
appending for display in said second pane decoded trace data for multiple trace events selected in the trace event tree pane;
displaying full decoding in said second pane;
toggling auto-scrolling, wherein when a trace event is selected in the event tree pane and the decoded trace data for said trace event is displayed in said second pane, original trace data in said third pane is automatically scrolled to show original trace data for the selected trace event.

12. The display of claim 4, wherein said second display pane contains for a selected trace a trace header Information block and, for each decoded event responsive to said selected trace, an event header information block, an event data section for displaying in hexadecimal form binary data that is to be decoded, and an event decoding section for displaying said binary data in a first column and corresponding decoding of said binary data in human readable prose format in a parallel second column.

13. The display of claim 12, wherein said tool bar contains filter control icons for providing at least one of:
showing or hiding said event header section;
showing or hiding said event data section;
showing or hiding said event decoding section;
showing or hiding the binary zeros shown in said first column.

14. The display of claim 4, wherein said status pane contains a status bar for showing whether the state of said display is LOADING TRACE FILE or COMPLETE, wherein if the display state is DECODING TRACE FILE then said status pane also contains a representation of a remainder to be decoded.

15. The display of claim 14, wherein said tool bar contains a status label for indicating the number of events decoded from the loaded trace file.

16. The display of claim 4, wherein said tool bar contains label icons for displaying properties of the original trace in said third display pane.

17. The display of claim 4, wherein said first display pane, said second display pane, said third display pane, said control pane, said tool bar pane, and said status pane appear on a single display page.

* * * * *